June 12, 1928.  
E. LEGELER  
1,672,948  
PROCESS FOR THE CONTINUOUS PURIFICATION OF RAW BISULPHIDE OF CARBON  
Filed April 14, 1925
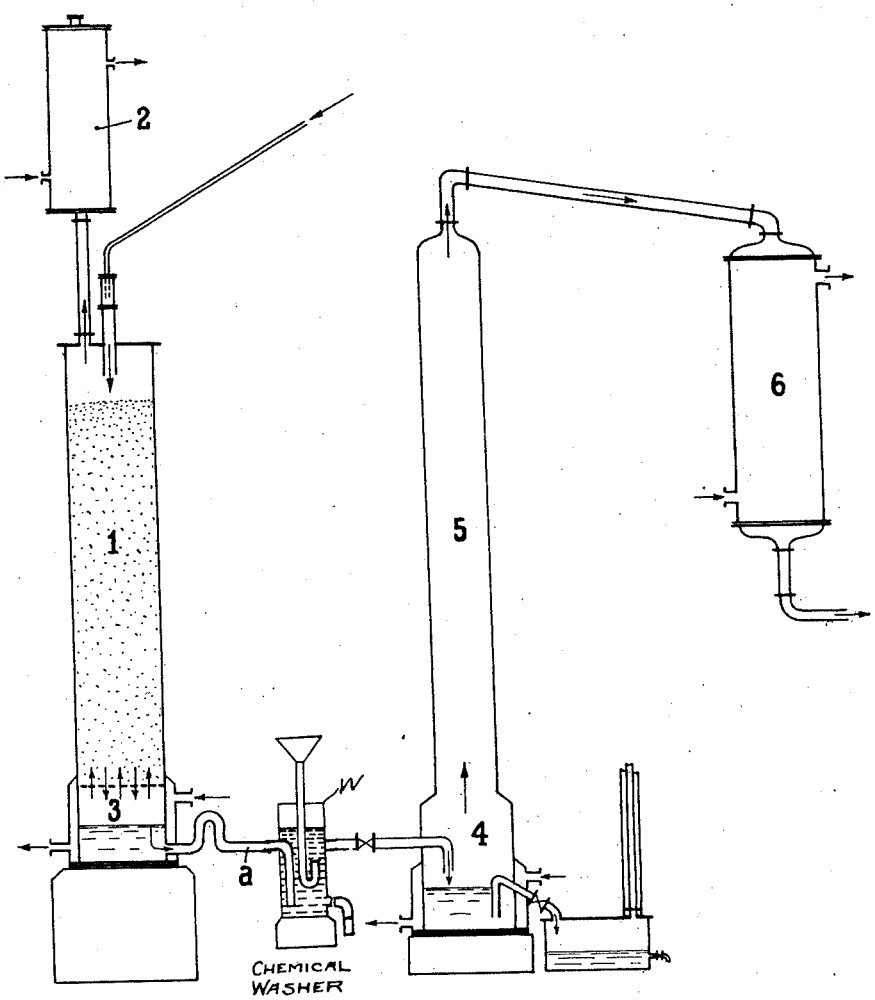
Inventor:  
E. Legeler  
By Marks&Clerk  
Attys.

Patented June 12, 1928.

1,672,948

UNITED STATES PATENT OFFICE.

EBERHARD LEGELER, OF PREMNITZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

PROCESS FOR THE CONTINUOUS PURIFICATION OF RAW BISULPHIDE OF CARBON.

Application filed April 14, 1925, Serial No. 22,981, and in Germany September 3, 1924.

The well known processes for purifying raw bisulphide of carbon show a number of drawbacks.

First of all, the sulphur remains in the stills, so that a repeated distillation of the first runnings which have been contaminated by sulphide of hydrogen, becomes necessary. Besides, the processes known require a comparatively large set of apparatus.

The present invention does not only obviate these drawbacks, but has the additional great advantage that only small quantities of bisulphide of carbon are circulating, so that the danger of the process is reduced to a considerable extent.

The invention consists in purifying the raw bisulphide of carbon from its contaminations (such as sulphur, sulphide of hydrogen, and certain organic combinations having a bad smell) by means of a perfectly continuous working process.

The present process consists especially in firstly eliminating the sulphide of hydrogen in the form of gas, which can be subsequently regenerated into sulphur according to well known processes, for instance with other intermixed combinations of sulphur. After a previous chemical purification by means of lye or acids, or without such purification, the raw bisulphide of carbon, which has been freed from sulphide of hydrogen is then led into a column, in the lower jacketed heating chamber of which a concentrated solution of sulphur in bisulphide of carbon accumulates, which can either be discharged at any desired intervals, or which permanently flows off automatically.

One form of execution of the process works, for instance, as follows:—

A set of apparatus, adapted for this purpose, is diagrammatically shown in the accompanying drawing.

From a reservoir, located, behind a protecting wall, the raw bisulphide of carbon flows into a rectifying tower 1, having a jacketed heating chamber 3, in which sulphide of hydrogen is expelled from the raw bisulphide of carbon by means of pure bisulphide of carbon vapours rising from the bottom to the top. Above the rectifying column, a reflux condenser 2 is arranged, for the purpose of condensing the bisulphide of carbon vapours carried upwards by the sulphide of hydrogen. The bisulphide of carbon, which has been purified of the sulphide of hydrogen, accumulates in the heating chamber 3 located at the bottom of the rectifying column, from whence it is continuously withdrawn into the still of a second column 5 by means of a swan-necked pipe $a$. According to the degree of purity required, a chemical washer W may be inserted into this drawing off pipe $a$, the bisulphide of carbon passing through a tower charged with sodium hydroxide or acid. The arrangement of the chemical washer W depends on whether the liquid which fills container W has a lower or a higher specific gravity than the liquid carbon bisulphide, passing from $a$. If the specific gravity is higher the carbon bisulphide passing out of $a$ must enter into the washing apparatus W from below, since it rises as a result of its lesser specific gravity. If, however, the specific gravity of the washing liquid in W is less than that of the carbon bisulphide passing from $a$, the latter must be introduced into the washing apparatus above, as it will sink through the lighter washing liquid.

The sulphur and certain organic sulphur compounds still contaminating the carbon disulphide are removed in the distilling column 5 in such a manner that the semi-purified carbon disulphide, leaving $a$ or the washer W and introduced into the jacketed heating chamber 4 of the column 5, located beneath the column 5, flows upon a boiling concentrated solution of sulphur in carbon disulphide. This concentrated solution of sulphur may, for instance, contain 170 parts by weight of sulphur in 100 parts by weight of bisulphide of carbon. This solution is maintained at a temperature of, for instance, 55° by means of the steam jacket J. On the inflow into this solution, the semi-purified bisulphide of carbon is evaporated, whilst the sulphur and certain organic combinations thereof remain in the concentrated solution of sulphur, from whence they flow from time to time or continuously, either through a heated pipe with stop cock or a heated level-tube into a vessel filled with as cold water as possible, in which vessel both bisulphide of carbon and sulphur will soon separate, the larger proportion of the sulphur crystallizing out.

The bisulphide of carbon vapours, rising through the column 5 and further purified on this way, are condensed in a cooler 6 and led to the store-tank.

Having now particularly described and ascertained the nature of my said invention and in what manner the same is to be performed, I declare that, what I claim is:—

1. The process of continuously refining raw carbon disulphide which comprises passing liquid raw carbon disulphide in countercurrent to vapors of carbon disulphide generated in the heating chamber of a rectifying column to remove sulphuretted hydrogen, introducing the partially refined carbon disulphide containing sulphur and sulphur compounds into the heating chamber of a distilling column in which a solution of sulphur in carbon disulphide is kept boiling, collecting and condensing the escaping vapors of carbon disulphide, and withdrawing the excess of the sulphur solution from the said chamber.

2. The process of continuously refining raw carbon disulphide which comprises passing liquid raw carbon disulphide in countercurrent to vapors of carbon disulphide generated in the heating chamber of a rectifying column to remove sulphuretted hydrogen, passing the partially refined carbon disulphide containing sulphur and sulphur compounds through a chemical washer into the heating chamber of a distilling column in which a solution of sulphur in carbon disulphide is kept boiling, collecting and condensing the escaping vapors of carbon disulphide, and withdrawing the excess of the sulphur solution from the said chamber.

3. The process of continuously refining raw carbon disulphide which comprises passing liquid raw carbon disulphide in countercurrent to vapors of carbon disulphide generated in the heating chamber of a rectifying column to remove sulphuretted hydrogen, refluxing the vapors to condense carbon disulphide, introducing the partially refined carbon disulphide containing sulphur and sulphur compounds into the heating chamber of a distilling column in which a solution of sulphur in carbon disulphide is kept boiling, collecting and condensing the escaping vapors of carbon disulphide, and withdrawing the excess of the sulphur solution from the said chamber.

In testimony whereof I have signed my name to this specification.

Dr. Ing. EBERHARD LEGELER.